United States Patent
Yagi (10) Patent No.: US 8,508,774 B2
(45) Date of Patent: Aug. 13, 2013

(54) IMAGE PROCESSING APPARATUS, METHOD FOR CONTROLLING IMAGE PROCESSING APPARATUS, AND RECORDING MEDIUM

(75) Inventor: Yuichi Yagi, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 263 days.

(21) Appl. No.: 12/795,420

(22) Filed: Jun. 7, 2010

(65) Prior Publication Data
US 2010/0315675 A1    Dec. 16, 2010

(30) Foreign Application Priority Data
Jun. 15, 2009    (JP) ................................ 2009-142535

(51) Int. Cl.
*G06F 3/12*    (2006.01)
(52) U.S. Cl.
USPC ......................... 358/1.15; 358/1.13; 358/402
(58) Field of Classification Search
USPC .............. 358/1.15, 402, 474, 1.13, 1.16, 401, 358/440
See application file for complete search history.

(56) References Cited

U.S. PATENT DOCUMENTS

| | | | | |
|---|---|---|---|---|
| 6,687,742 B1 * | 2/2004 | Iwazaki | ........................ | 709/206 |
| 8,054,492 B2 * | 11/2011 | Yoshida et al. | .............. | 358/1.15 |
| 8,174,712 B2 * | 5/2012 | Richardson et al. | ......... | 358/1.15 |
| 2003/0035139 A1 * | 2/2003 | Tomita et al. | ................ | 358/1.15 |
| 2004/0263898 A1 * | 12/2004 | Ferlitsch | ...................... | 358/1.15 |

FOREIGN PATENT DOCUMENTS

JP    2003-198819 A    7/2003

* cited by examiner

*Primary Examiner* — Vu B Hang
(74) *Attorney, Agent, or Firm* — Canon U.S.A., Inc. IP Division (57) ABSTRACT

An image processing apparatus capable of transmitting image data to an external device includes a display unit for displaying a list of information indicating transmission destinations to transmit the image data, a selection unit for selecting information in the list, a determination unit for determining whether the selected information satisfies a particular condition, and a transmission unit for transmitting, when the selected information does not satisfy the particular condition, the image data to the transmission destination indicated by the selected information, and transmitting, when the selected information satisfies the particular condition, information indicating that the image data has not been transmitted to the transmission destination indicated by the selected information. The transmission unit transmits, in response to reception from the external device received the information indicating that the image data has not been transmitted of a request to transmit untransmitted image data, the untransmitted image data to the external device.

6 Claims, 9 Drawing Sheets

IMAGE PROCESSING APPARATUS, METHOD FOR CONTROLLING IMAGE PROCESSING APPARATUS, AND RECORDING MEDIUM

BACKGROUND OF THE INVENTION

1. Field of the Invention

The present invention relates to an image processing apparatus which has a function of transmitting input image data to an external device, and a method for controlling the image processing apparatus.

2. Description of the Related Art

Various systems for an image processing apparatus to transmit input image data to an external device such as a personal computer (PC) and store the image data have been used. For example, some systems have been used as a scanning system for transmitting image data generated by reading a document image using a scanner to an external device such as a PC.

One is a system for a user to use a scanner driver installed in a PC which is a transmission destination of image data, to operate the scanner driver on the PC, transmit a scan instruction to a scanner to perform scanning, and acquire the image data. This system is used for the PC to acquire the image data from the scanner which is referred to as a "Pull scanning system (hereinafter referred to as Pull scanning)".

The second is a system for a user to directly operate an operation panel of a scanner, input a scan instruction after designating a transmission destination of image data to perform scanning, and transmit the image data to a PC at the transmission destination. This system is used for the scanner to transmit the image data to the PC which is referred to as a "Push scanning system (hereinafter merely referred to as Push scanning)". In the Push scanning system, protocols such as File Transfer Protocol (FTP), Server Message Block (SMB), and Simple Mail Transfer Protocol (SMTP) are generally used to transmit the image data to the PC via a network.

The third is a system for a user to directly operate an operation panel of a scanner, and transmit an instruction to execute Pull scanning to a PC selected on the operation panel. The PC that has received the instruction to execute Pull scanning starts the Pull scanning using a scanner driver installed in the PC. In this system, the user designates scan settings such as a reading condition previously set by the scanner driver on the operation panel of the scanner, and the scanner driver executes the Pull scanning according to the scan settings. In this system, the user need not operate the PC, as in Push scanning, and issues a scan instruction on the operation panel of the scanner. However, the PC then acquires the image data from the scanner, as in the Pull scanning. Therefore, the system is referred to as a "pseudo Push scanning system (hereinafter merely referred to as pseudo Push scanning)".

As described above, in the Pull scanning, the scan instruction is received from the PC (scanner driver) which is the transmission destination of the image data. Therefore, the transmission destination of the image data is uniquely specified. On the other hand, in the Push scanning and the Pseudo Push scanning, a method for displaying information representing a list of transmission destinations previously registered in the scanner on the operation panel of the scanner and making the user select the transmission destination from the list has been considered (Japanese Patent Application Laid-Open No. 2003-198819).

When the transmission destination of the image data is selected on the operation panel in the image processing apparatus, as in the Push scanning and the pseudo Push scanning, as described above, the following issue occurs. When PC names representing the transmission destinations overlap in a plurality of PCs and a user who operates the operation panel in the image processing apparatus selects one of the PCs having the overlapping name without noticing it, image data is transmitted to the PC different from the PC intended by the user. Thus, erroneous transmission of image data may occur.

On this issue, when the PC name representing the transmission destination is registered in the image processing apparatus, the PC name may be inhibited from being registered if it overlaps the other PC name. However, when a model name of the PC, for example, is automatically registered in the image processing apparatus by information notified from the scanner driver, inhibition of the registration and automatic change of the registered name may rather degrade operability. Although the registered names are not actually identical, characters, in a portion displayed on the operation panel in the image processing apparatus, of the names may be identical. In such a case, a method for inhibiting the overlapping name from being registered is not necessarily an effective measure.

SUMMARY OF THE INVENTION

The present invention is directed to suppressing, when an image processing apparatus transmits input image data to an external device, erroneous transmission that occurs by a user selecting a transmission destination from an operation unit in the image processing apparatus, to more reliably transmit the image data.

According to an aspect of the present invention, an image processing apparatus capable of transmitting input image data to an external device includes a display unit configured to display a list of information indicating candidates for transmission destinations to which the image data is transmitted, a selection unit configured to select any one of the information in the list displayed by the display unit, a determination unit configured to determine whether the information selected by the selection unit satisfies a particular condition, and a transmission unit configured to transmit, when the selected information does not satisfy the particular condition, the image data to the transmission destination indicated by the selected information, and to transmit, when the selected information satisfies the particular condition, information indicating that the image data has not been transmitted to the transmission destination indicated by the selected information, wherein the transmission unit transmits, in response to reception from the external device which has received the information indicating that the image data has not been transmitted of a request to transmit untransmitted image data, the untransmitted image data to the external device.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
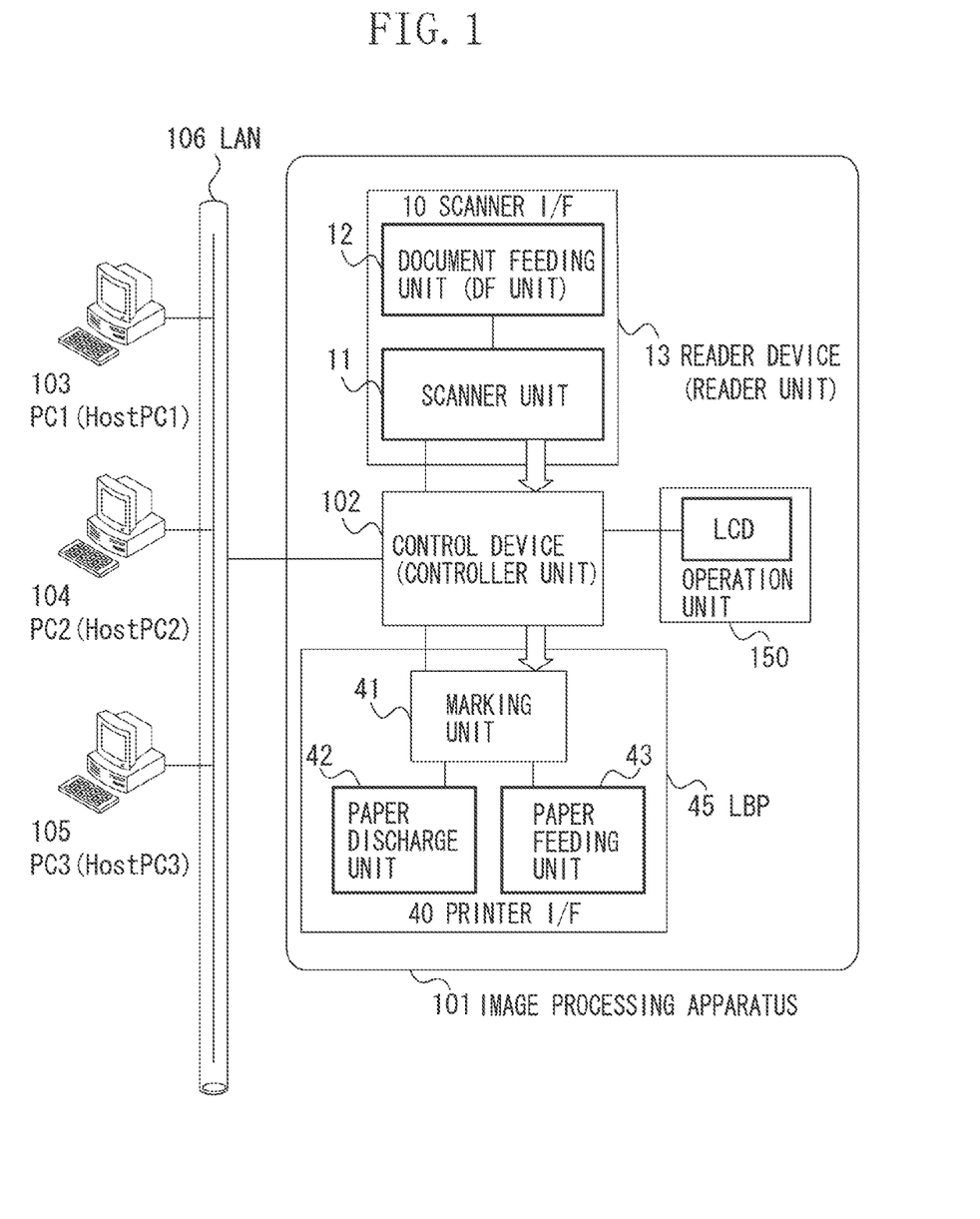
FIG. 1 illustrates a network system according to an exemplary embodiment of the present invention.

FIG. 1 illustrates a configuration of an image processing apparatus 101 in an exemplary embodiment of the present invention and a configuration of a network system to which the image processing apparatus 101 is connected. In FIG. 1, a reader device 13 optically reads a document image, and converts the read document image into image data. The reader device 13 includes a scanner unit 11 having a function of reading a document, and a document feeding unit 12 having a function of conveying document paper. A laser beam printer (LBP) unit (image output device) 45 conveys recording paper, prints the image data as a visible image on the recording paper, and discharges the recording paper from the image processing apparatus to the outside. The LBP unit 45 includes a paper feeding unit 43 including a plurality of types of recording paper cassettes, a marking unit 41 having functions of transferring and fixing the image data on the recording paper, and a paper discharge unit 42 having functions of sorting and stapling the recording paper on which the image data has been printed and outputting the recording paper to the outside. A control device (a controller unit) 102 is electrically connected to the reader device 13 and the LBP unit 45, and is further connected to a PC1 103, a PC2 104, and a PC3 105 via a network 106.

The control device 102 provides a copying function by controlling the reader device 13 to read the image data on the document, and controlling the LBP unit 45 to output the image data to the recording paper. The control device 102 further provides a function of transmitting the image data read from the reader device 13 to an information processing apparatus such as the PC 103 via the network 106. An operation unit 150 is connected to the control device 102 and includes a liquid crystal display (LCD) 135 and a hard key, described below. Further, the operation unit 150 provides a user interface (I/F) for operating the image processing apparatus 101.

Figure 2:
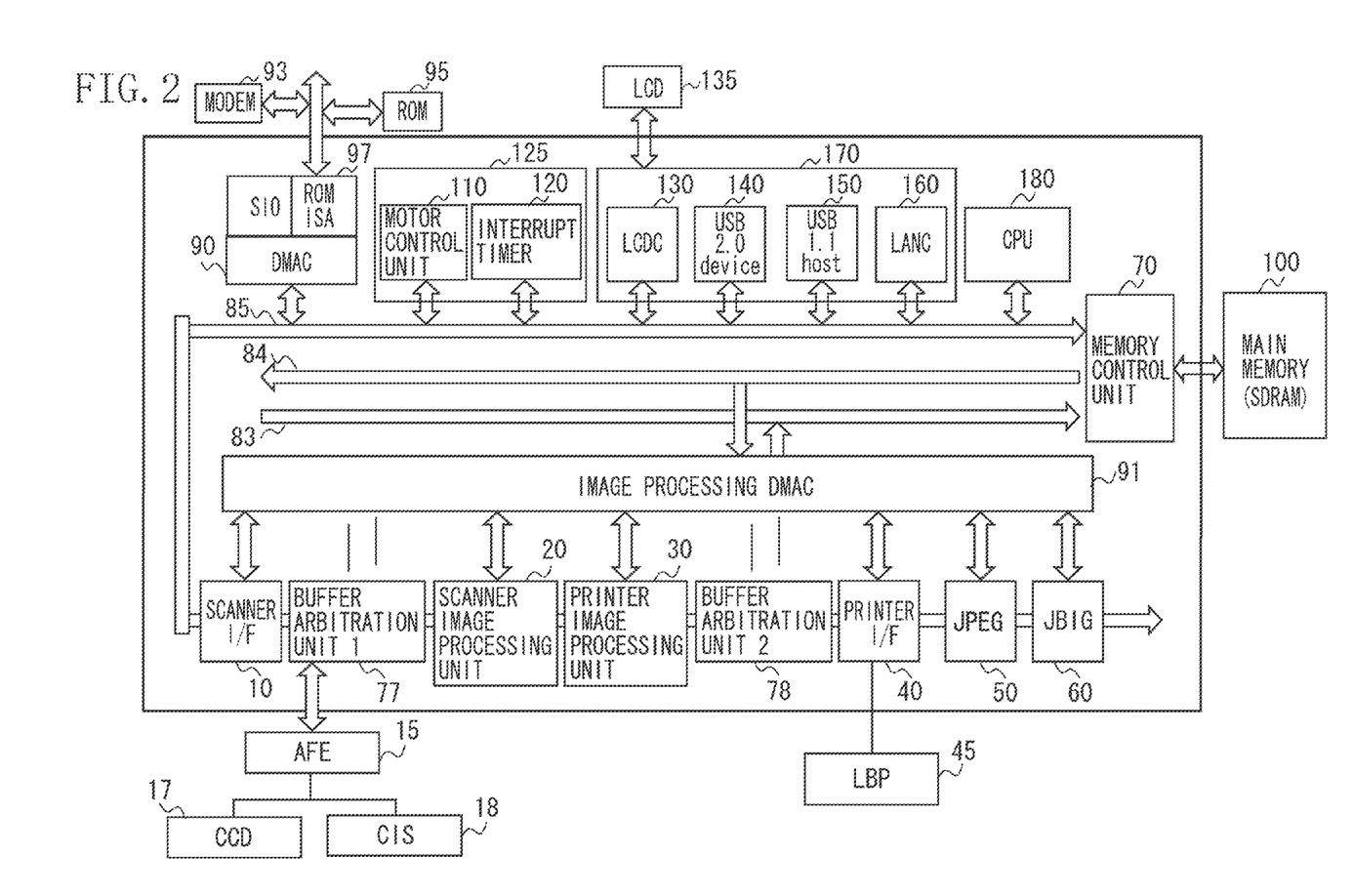
FIG. 2 illustrates a hardware configuration of an image processing apparatus according to the present exemplary embodiment.

The function of the control device 102 will be described in detail with reference to FIG. 2. FIG. 2 illustrates a hardware configuration of the control device 102 included in the image processing apparatus 101.

A charge coupled device (CCD) 17 and a contact image sensor (CIS) 18 are connected to a scanner interface (I/F) unit 10 via an analog front end (AFE) 15. Therefore, the scanner IF unit 10 can load read data into the control device (102 illustrated in FIG. 1) without an individual dedicated circuit.

The scanner I/F unit 10 can cope with the CCD 17 and the CIS 18 as image reading devices, and performs input processing of signals of both the image reading devices. Image data input from these devices is direct memory access (DMA) transferred by a memory control unit 70, and is rasterized on a main memory 100.

A scanner image processing unit 20 executes image processing corresponding to an image processing operation mode (a color copy, a monochrome copy, a color scan, a monochrome scan, etc.) for the image data rasterized on the main memory 100 by the processing of the scanner I/F unit 10. A buffer arbitration unit 77 arbitrates, when data is transmitted and received between the scanner I/F unit 10 and the scanner image processing unit 20 via a ring buffer area on the main memory 100, writing and reading of the data.

A printer image processing unit 30 is used to edit an area of an input image, convert resolution of the image, and output obtained image data using a printer. An LBP I/F 40 outputs an image processing result to the LBP 45 connected thereto.

A buffer arbitration unit 78 arbitrates, when data between is transmitted and received between the printer image processing unit 30 and the LBP I/F 40 via a ring buffer area on the main memory 100, writing and reading of the data. Although basic configurations of the buffer arbitration units 77 and 78 include an identical block, respective control methods differ depending on an application to be used.

A Joint Photographic Experts Group (JPEG) module 50 and a Joint Bi-level Image Experts Group (JBIG) module 60 are processing units conforming to a predetermined standard which execute compression and expansion processing of image data. The memory control unit 70 is connected to a first bus 83 and a second bus 84 in an image processing system and a third bus 85 in a computer system, and performs data transfer control for writing and reading data to and from the main memory (synchronous dynamic random access memory (SDRAM)) 100.

A direct memory access controller (DMAC) 90 is connected to a read-only memory (ROM) 95 via a ROM industry standard architecture (ROMISA) 97, and generates and sets predetermined address information for performing DMA control for data transmission and reception between an external device or various I/F units (e.g. a communication and user interface control unit 170) and the main memory 100 in corporation with the memory control unit 70. A DMAC 91 generates and sets predetermined address information for performing DMA control for data transmission and reception between each of the image processing units 10, 20, 30, and 40 and the main memory 100 in cooperation with the memory control unit 70. For example, address information for performing DMA transfer of the image data read by the scanner I/F unit 10 to the main memory 100 is generated for each DMA channel according to a type of the image reading device (i.e. the CCD 17 or the CIS 18). Further, the DMAC 91 functions as a unit for performing, together with the memory control unit 70, DMA control between each of the image processing units 10, 20, 30, and 40 and the main memory 100, for example, for DMA transferring image data rasterized on the main memory 100 to the scanner image processing unit 20.

The ROM 95 stores a suitable control parameter and control program data according to the image reading device (i.e. the CCD 17 or the CIS 18). Therefore, input processing of image data can be performed according to a data output format corresponding to each of the CCD 17 and the CIS 18, so that a dedicated interface circuit need not be provided. The ROM 95 stores data to be stored irrespective of OFF/ON of a power supply because it can store nonvolatile data.

The first bus 83 can transmit the data read out of the main memory 100 to each of the processing units 10 to 60 in the image processing system. The second bus 84 can transmit data read out of each of the processing units 10 to 60 in the image processing system to the main memory 100. The first and second buses 83 and 84 are paired, to transmit and receive the image data between the image processing block and the main memory 100. A central processing unit (CPU) 180, the communication and user interface control unit 170, a mechatronics system control unit 125, a control register in the image processing unit, and the DMAC 90 are connected to the third bus 85 in the computer system.

The mechatronics system control unit 125 includes a motor control unit 110, and an interrupt timer control unit 120 for performing control of driving timing of a motor and timing for controlling synchronization of processing in the image processing system.

An LCD control unit 130 is used to perform display control for displaying various types of settings of the image processing apparatus 101, processing conditions, and the like on the LCD 135. Universal Serial Bus (USB) interface units 140 and 150 enable connection to peripheral devices. A media access control (MAC) unit 160 controls timing at which data is to be transmitted to a device to be connected (access), for example. The MAC unit 160 is also used when it communicates with the other devices (103 to 105 illustrated in FIG. 1) via the local area network (LAN) (106 illustrated in FIG. 1). The CPU 180 controls the entire operation of the image processing apparatus 101. Drivers on the PCs (103 to 105 illustrated in FIG. 1) will be described below.

Figure 3:
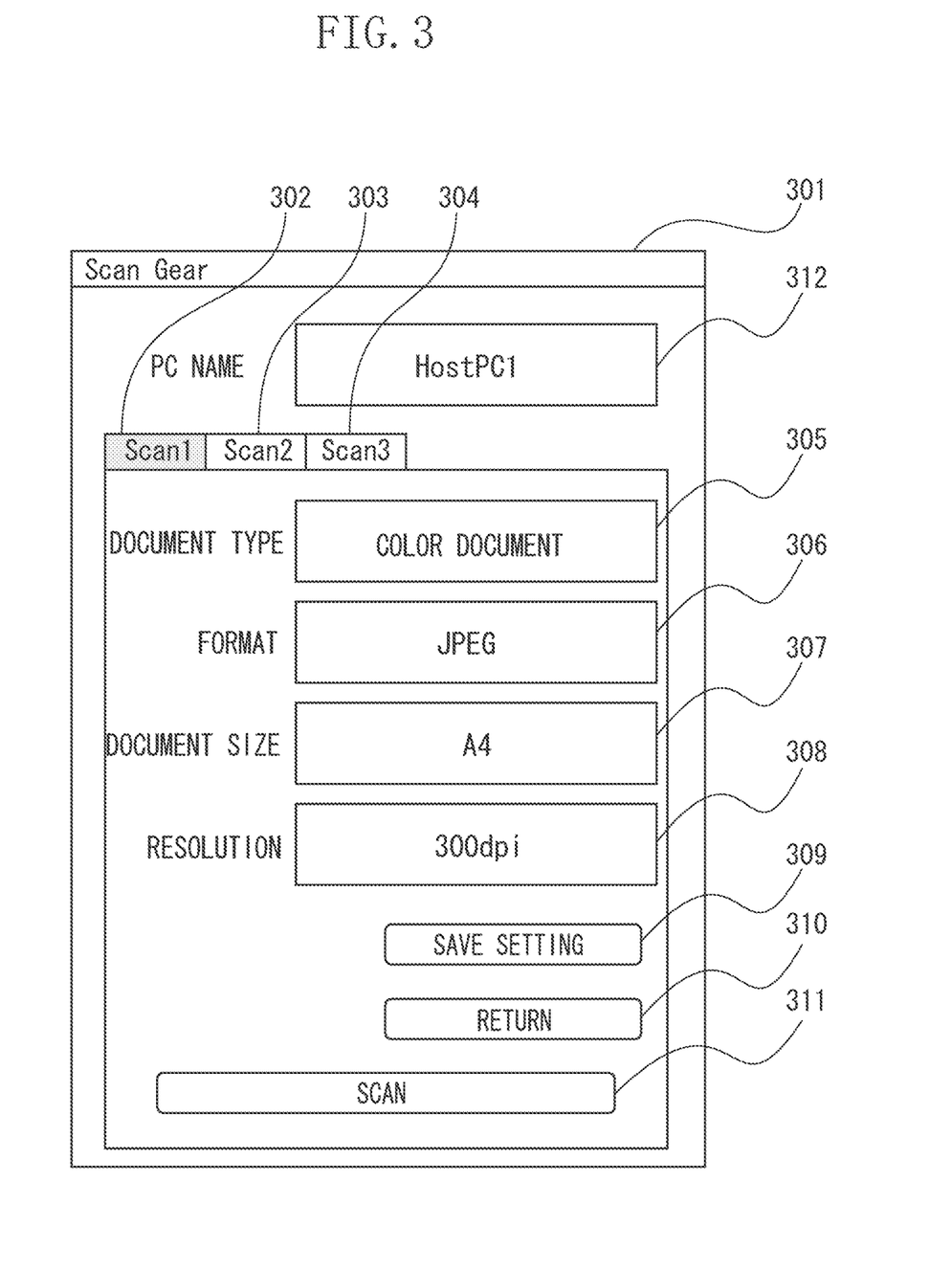
FIG. 3 illustrates a screen of a scanner driver displayed on a PC in the present exemplary embodiment.

A screen 301 illustrated in FIG. 3 is displayed on the PC 103 when Pull scanning is performed from the PC 103. In an input column 312, a PC name to be displayed on the operation unit 150 when a transmission destination is selected in the image processing apparatus 101 in pseudo Push scanning, described below, is input. In initialization setting performed when the driver is installed, a computer name is registered as it is. However, a user can change the computer name into any PC name. Therefore, different PC names are not necessarily set, respectively, in the PCs. The same PC name may be set in the plurality of PCs. When the user changes the PC name, the PC notifies the image processing apparatus 101 that the PC name has been changed. Then, the image processing apparatus 101 changes the PC name registered in itself according to the changed content.

Input columns 305 to 307 are used to input scan settings. The input column 305 is used to select a type of a document when the document is read. Options include a color document and a monochrome document. The input column 306 is used to designate a file format when image data received from the image processing apparatus 101 is stored, for example, JPEG, Tagged Image File Format (TIFF), Portable Document Format (PDF), and Bit Map (BMP). The input column 307 is used to designate a size of a document to be scanned. An input column 308 is used to designate resolution of an image to be scanned. The user can input the scan settings, respectively, in the input columns 305 to 308. When the user presses a setting storage button 309, the input settings are stored. A return button 310 is used to return to a predetermined previous screen.

The scanner driver in the present exemplary embodiment can store up to three scan settings including values in each of the input columns 305 to 308. The three scan settings are respectively registered as scan tubs 302 to 304. When the user selects any one of the scan tubs, the stored scan setting values are displayed on the screen.

A scan button 311 is used to instruct the image processing apparatus 101 to start scanning based on the scan setting values input in the input columns 305 to 308. When the scan button 311 is pressed, the image processing apparatus 101 starts to read a document, and image data is transmitted from the image processing apparatus 101 to the PC 103. The image data is subjected to image processing based on the scan setting values in the input columns 305 to 308 to obtain a desired image. However, either the image processing apparatus 101 or the PC 103 may perform the image processing. In the present exemplary embodiment, the PC 103 performs the image processing. In the pseudo Push scanning, the image processing apparatus 101 issues an instruction corresponding to an instruction to start Pull scanning, i.e., to press the scan button 311 to the PC 103, to realize transmission of the image.

Figure 4:
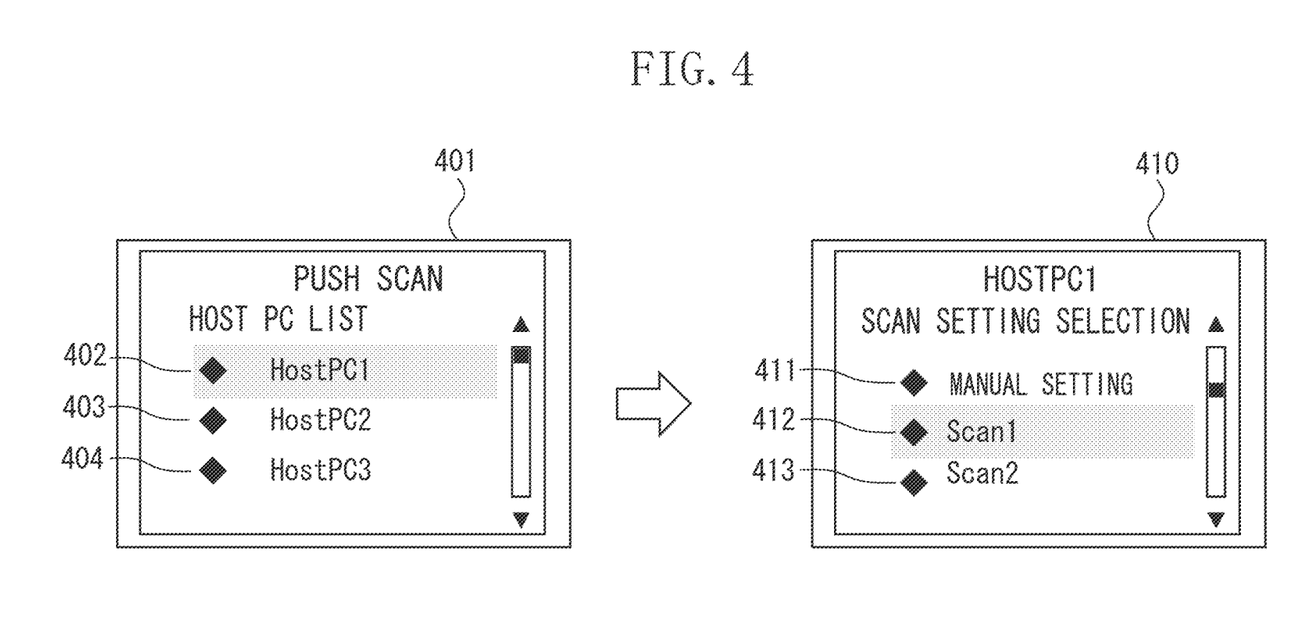
FIG. 4 illustrates a screen displayed on a display unit in the image processing apparatus according to the present exemplary embodiment.

FIG. 4 illustrates an example of a screen displayed on the LCD 135 in the image processing apparatus 101 when the pseudo Push scanning is performed. A screen 401 is displayed when the user gives an instruction to perform pseudo Push scanning using the operation unit 150 in the image processing apparatus 101. On the screen 401, a list of PC names of PCs to be transmission destinations of scanned image data is displayed. The displayed PC name is input in the input column 312 in the scanner driver in each of the PCs. In the example illustrated in FIG. 4, three PC names 402 to 404 are displayed as candidates for the transmission destinations.

A scan setting selection screen 410 illustrated in FIG. 4 is displayed when any one of the PC names is selected on the screen 401. FIG. 4 illustrates an example of the screen 410 displayed when the HostPC1 (402) is selected on the screen 401. On the screen 410, scan settings 411 to 413 are displayed as selection candidates. "Scan1" 412 and "Scan2" 413 correspond to scan settings registered in the scanner driver in the PC. "Scan3" (not illustrated) is also displayed on the screen 410 by moving a scroll bar.

When the user selects one of the scan settings, scanning processing is executed based on the corresponding scan setting. On the other hand, when the user selects "manual setting" 411, a scan setting screen (not illustrated) is displayed on the LCD 135. The user manually inputs the scan setting. When no scan setting is registered in the PC selected on the screen 401, only "manual setting" 411 is displayed on the screen 410.

When the user presses a start key in the operation unit 150 after selecting the PC to be the transmission destination of the image data on the screen 401 and further selecting the scan setting on the screen 410, the document is scanned, so that the Pseudo Push scanning is executed. When not the pseudo Push scanning but Push scanning is performed, a screen for the user to select a transmission destination is also displayed on the LCD 135 in the image processing apparatus 101. In this case, addresses respectively corresponding to a plurality of transmission destinations (e.g., PCs) are registered as an address book in the image processing apparatus 101, and the content of the address book, i.e., a list of addresses is displayed on the LCD 135. The addresses to be displayed may include an Internet protocol (IP) address, an electronic mail (e-mail) address, and a host name. Alternatively, a name arbitrarily given to an address by the user may be displayed.

According to the present exemplary embodiment, when a transmission destination of scanned image data is selected on an operation screen in the image processing apparatus 101 to transmit the image data, as in the pseudo Push scanning and the Push scanning, erroneous transmission can be suppressed. More specifically, when names of the destinations to be displayed as a list of candidates for the transmission destinations overlap or are not easily distinguished, erroneous transmission of the image data can also be suppressed. A specific processing method therefor will be described below.

Figure 5:
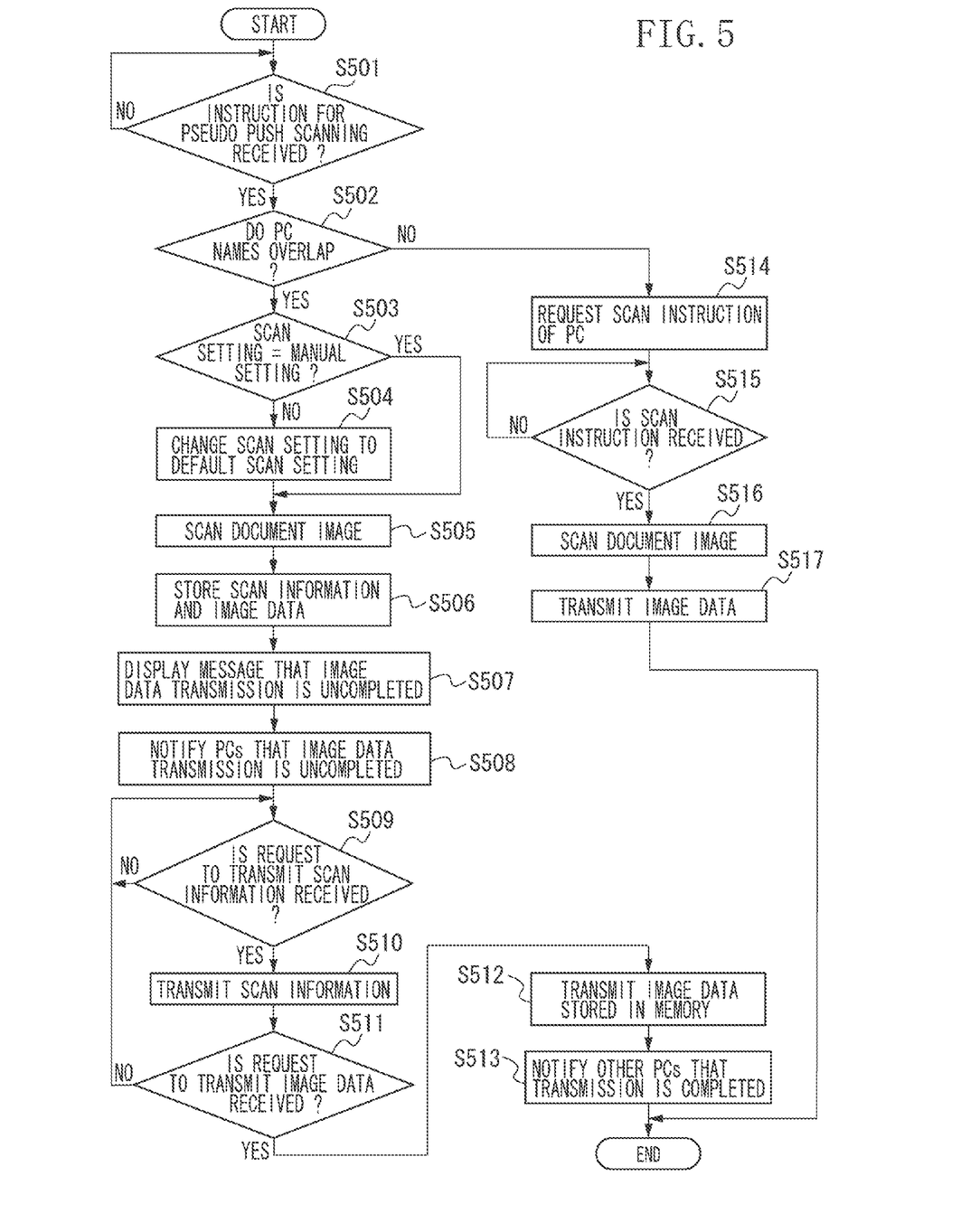
FIG. 5 is a flowchart illustrating operations executed in the image processing apparatus according to the present exemplary embodiment.

FIG. 5 is a flowchart illustrating processing performed when the image processing apparatus 101 executes pseudo Push scanning in the present exemplary embodiment. The CPU 180 in the image processing apparatus 101 executes a program stored in the ROM 95 or the like, to process each of steps illustrated in FIG. 5.

In step S501, the image processing apparatus 101 determines whether an instruction for pseudo Push scanning is received. If the instruction for pseudo Push scanning has been received (YES in step S501), the processing proceeds to step S502. More specifically, the CPU 180 in the image processing apparatus 101 determines whether the start key in the operation unit 150 is pressed with the transmission destination of the image data and the scan setting selected on the screens 401 and 410 illustrated in FIG. 4.

In step S502, the image processing apparatus 101 determines whether PC names selected as the transmission destinations in the instruction for pseudo Push scanning received in step S501 overlap. More specifically, the image processing apparatus 101 determines whether a list of transmission destinations managed as destinations in the pseudo Push scanning by the image processing apparatus 101 includes a transmission destination with the same name as that of the transmission destination selected in step S501 and displayed on the screen 401. If it is determined that the list of transmission destinations includes the transmission destination with the same name (YES in step S502), the processing proceeds to step S503. If not (NO in step S502), the processing proceeds to step S515.

Figure 7:
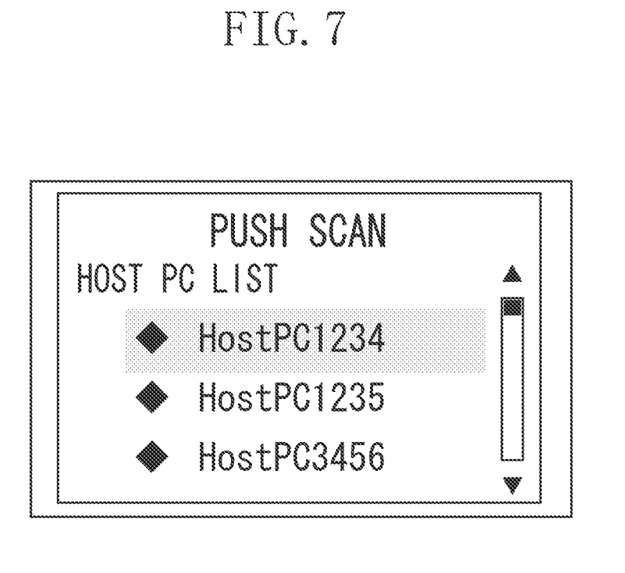
FIG. 7 illustrates a screen displayed on the display unit in the image processing apparatus according to the present exemplary embodiment.

The determination in step S502 need not be the determination whether the PC names overlap. For example, it may be determined whether names displayed on the screen 401 as candidates for transmission destinations are similar to the other to a predetermined value (number of characters) or more. When "HostPC1234" and "HostPC1235", for example, are displayed, they are apparently not easily distinguished. FIG. 7 illustrates an example of a screen displayed on the LCD 135 in the image processing apparatus 101 in this case. It may be thus determined whether other transmission destinations have similar names. At this time, the user may be allowed to previously register the number of characters (a threshold value) to be a basis for determining whether displayed names are similar in the image processing apparatus 101.

Figure 8:
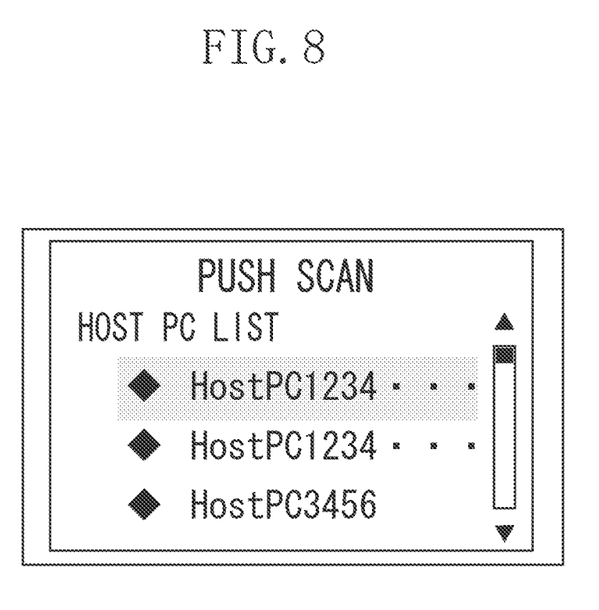
FIG. 8 illustrates a screen displayed on the display unit in the image processing apparatus according to the present exemplary embodiment.

It may be determined in step S502 whether the number of characters in the name of the transmission destination selected in step S501 exceeds the number of characters that can be displayed on the LCD 135. More specifically, when the name registered in the image processing apparatus 101 as the transmission destination is "HostPC12345", and the number of characters that can be displayed on the LCD 135 is ten, only "HostPC1234" is displayed on the screen 401. In this case, when another transmission destination named "HostPC12346" is registered, the user does not easily distinguish the transmission destinations from the display on the screen 401. FIG. 8 illustrates an example of a screen displayed on the LCD 135 in the image processing apparatus 101 in this case. Thus, the determination may be made in consideration of the number of characters that can be displayed on the LCD 135. It may be determined whether the number of characters in the name of the transmission destination selected in step S501 merely exceeds the number of characters that can be displayed. Alternatively, it may be determined whether another transmission destination that is the same as the transmission destination in the number of characters that can be displayed is registered. The user may be allowed to select either one of the determinations.

As described above, some methods are considered as a basis for the determination in step S502. In any case, the image processing apparatus 101 determines whether the display content (PC name, etc.) indicating the transmission destination selected in step S501 satisfies a particular condition. The particular condition is a condition under which the user may erroneously select a transmission destination. If this condition is satisfied (YES in step S502), the processing proceeds to step S503. If this condition is not satisfied (NO in step S502), the processing proceeds to step S514.

In step S503, the image processing apparatus 101 determines whether "manual setting" is selected as the scan setting in step S501. More specifically, the image processing apparatus 101 determines whether the user selects the manual setting 411 on the screen 410 in step S501, and then manually inputs the scan setting on a scan setting screen (not illustrated). If it is determined that the manual setting 411 has been selected (YES in step S503), the processing proceeds to step S505. On the other hand, if it is determined that the manual setting 411 is not selected (NO in step S503), the processing proceeds to step S504.

In step S504, the image processing apparatus 101 changes the content of the scan setting into not the scan setting selected on the screen 410 but a predetermined scan setting (default scan setting). This is because there is a possibility that the user may select the PC name of an unintended transmission destination in step S501. More specifically, this is to prevent the use of the scan setting registered in the scanner driver in an unintended PC. As the contents of the scan setting changed in step S503, the document type is "color", the resolution is "300 dpi", and the document size is "maximum reading size", for example. The contents of the scan setting are not limited to the above. Not the default scan setting, as in step S504, but a scan setting selected by the user may be used.

In step S505, the image processing apparatus 101 scans a document image based on the set scan setting, to generate image data.

In step S506, the image processing apparatus 101 stores the generated image data and scan information in the main memory 100. The scan information includes at least information indicating the date on which scanning is executed and scan settings such as the document type, the format, the document size, and resolution.

In step S507, the image processing apparatus 101 displays on the display unit (LCD 135) a message that the pseudo Push scanning is not completed. A message "Reading of the document is completed. Transmission of image data is not completed. Please make a request to transmit the image data from the PC", for example, may be displayed. Accordingly, the user can recognize that the pseudo Push scanning is not completed and a request to transmit the image data is to be made from the PC (scanner driver).

In step S508, the image processing apparatus 101 notifies a plurality of PCs whose names overlap with one another in step S502 that the pseudo Push scanning is not completed and untransmitted image data is stored in the image processing apparatus 101. The plurality of PCs having overlapping PC names includes the PC corresponding to the PC name selected by the user on the screen 401 in step S502 and other PCs having the same name as that of the selected PC displayed on the screen 401. The image processing apparatus 101 then waits until a request to transmit the scan information is made from the PC. More specifically, the image processing apparatus 101 waits until a request to transmit the scan information is made from the PC which is a destination of the notification in step S508.

In step S509, the image processing apparatus 101 determines whether it receives the request to transmit the scan information from the PC. If the image processing apparatus 101 has received the transmission request (YES in step S509), the processing proceeds to step S510. In step S510, the image processing apparatus 101 transmits the scan information stored in the main memory 100 in step S506 to the PC which is a transmission source of the transmission request received in step S509. The image processing apparatus 101 then waits until a request to transmit the image data is made from the PC.

In step S511, the image processing apparatus 101 determines whether it receives the request to transmit the image data from the PC. If the image processing apparatus 101 has received the transmission request (YES in step S511), the processing proceeds to step S512. In step S512, the image processing apparatus 101 transmits the image data stored in the main memory 100 in step S506 to the PC which is the transmission source of the transmission request received in step S511.

In step S513, the image processing apparatus 101 notifies the PCs other than the PC as the transmission destination in step S512 which are subjected to notification in step S508 that the transmission of the untransmitted image data is completed. The scanner drivers in the other PCs having overlapping PC names (the other PCs subjected to the notification in step S508) terminate (stop) display of a screen for prompting the user to make the request to transmit the scan information and the request to transmit the untransmitted image data.

In step S502, if it is not determined that the PC names overlap (NO in step S502), the processing proceeds to step S514. In step S514, the image processing apparatus 101 requests the PC corresponding to the PC name selected in step S501 to issue a scan instruction. More specifically, the scanner driver installed in the PC is requested to transmit an instruction to start scanning to the image processing apparatus 101. In step S515, the image processing apparatus 101 then determines whether the scan instruction is transmitted from the PC.

If the image processing apparatus 101 determines that it has received the scan instruction transmitted from the PC (YES in step S515), the processing proceeds to step S516. In step S516, the image processing apparatus 101 scans the document image based on the scan setting set on the screen 410 in step S501, to generate image data. In step S517, the image processing apparatus 101 transmits the image data to the PC selected on the screen 401 in step S501. In the above described way, the image processing apparatus 101 executes the pseudo Push scanning.

Although the destinations of the notification in step S508 are only the PCs having overlapping PC names, the notification may be made to all the PCs registered as transmission destinations in the image processing apparatus 101. The image processing apparatus 101 may respond to only a request to transmit the scan information from the PCs having overlapping PC names. The image processing apparatus 101 may periodically monitor whether the PC which is the destination of the notification in step S508 exists on the network 106, and delete the image data and the scan information that are stored in step S506 from the main memory 100 if the PC does not exist on the network 106.

Figure 6:
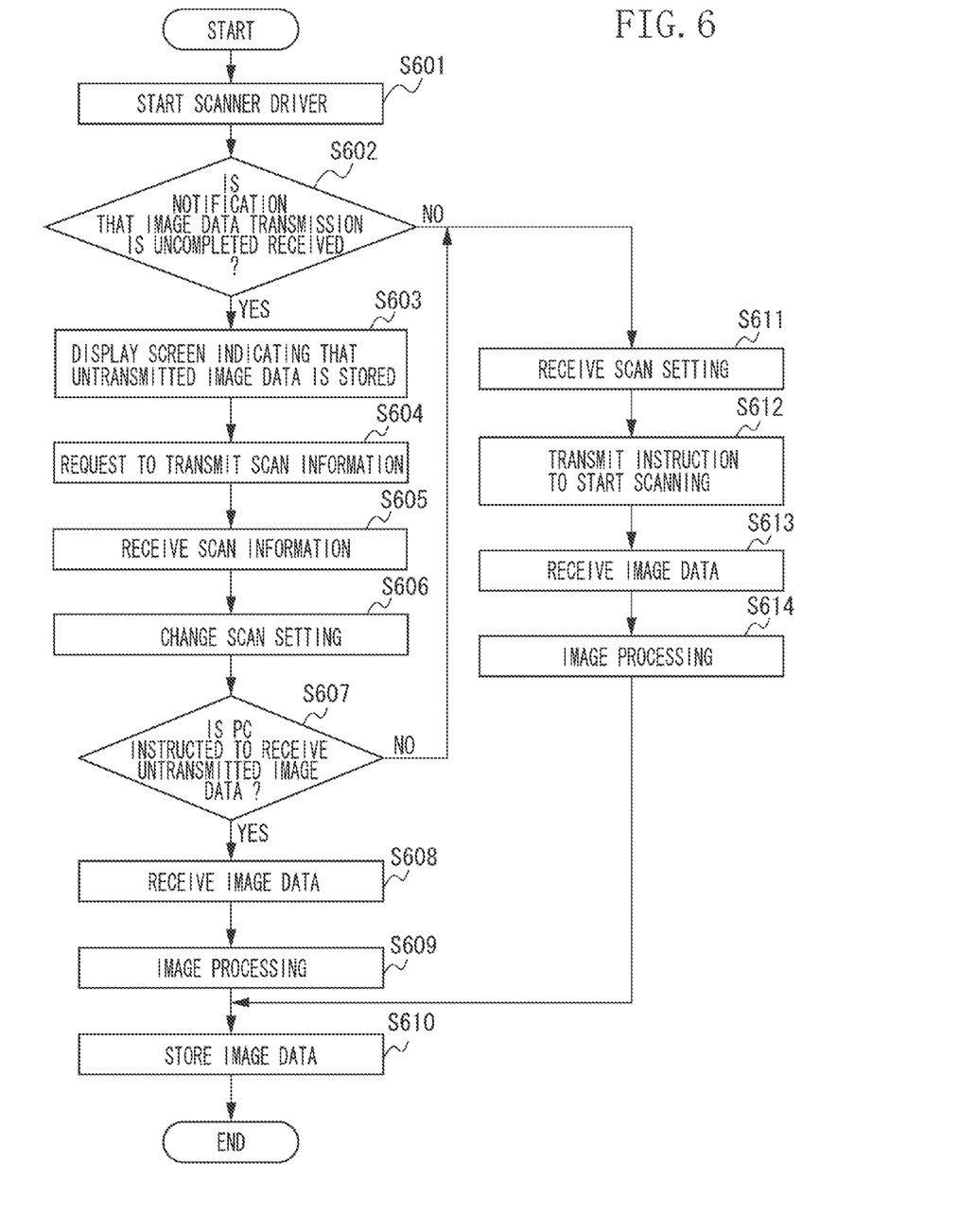
FIG. 6 is a flowchart illustrating operations executed in the PC according to the present exemplary embodiment.

FIG. 6 is a flowchart illustrating processing of the PC in which the scanner driver is installed according to the present exemplary embodiment. The CPU in the PC executes a program (e.g., the scanner driver) stored in a memory such as a ROM, to process each of steps illustrated in FIG. 6.

In step S601, the scanner driver is first started on the PC. In step S602, the PC determines whether it receives notification that pseudo Push scanning is not completed from the image processing apparatus 101. More specifically, the PC determines whether it receives the notification that is transmitted from the image processing apparatus 101 in step S508 illustrated in FIG. 5. If the PC determines that it has received the notification (YES in step S602), the processing proceeds to step S603. If the PC determines that it has not received the notification (NO in step S602), the processing proceeds to step S611.

The processing in steps S611 to S614 is normal Pull scanning. In step S611, the PC receives a scan setting set by the user based on the screen illustrated in FIG. 3 (a screen of the scanner driver). In step S612, the PC detects that the user presses the scan button 311 on the screen of the scanner driver, and transmits an instruction to start scanning to the image processing apparatus 101. In step S613, the PC receives the image data generated by the image processing apparatus 101 based on the scan setting set in step S611. In step S614, the PC performs image processing based on the scan setting set in step S611 on the received image data.

In step S602, if it is determined that the PC has received the notification that transmission is not completed (YES in step S602), the processing proceeds to step S603. In step S603, the PC displays on the display unit a screen indicating that untransmitted image data is stored in the image processing apparatus 101. More specifically, if the PC receives the notification that the transmission is not completed when the scanner driver in the PC is started, a sentence such as "untransmitted image data exists in the image processing apparatus 101" is displayed on an initial screen of the scanner driver. Alternatively, a pop-up window may be displayed in addition to the scanner driver. On this screen, a button such as "OK" for inputting approval from the user who has seen the display is displayed. If the "OK" button is pressed, the processing proceeds to step S604.

In step S604, the PC transmits a request to the image processing apparatus 101 for transmission of the scan information. More specifically, the PC requests the image processing apparatus 101 to transmit the scan information together with the untransmitted image data stored therein. In step S605, the PC receives the scan information transmitted from the image processing apparatus 101. When the scan information is received, the PC displays a screen for issuing an instruction to transmit the untransmitted image data.

Figure 9:
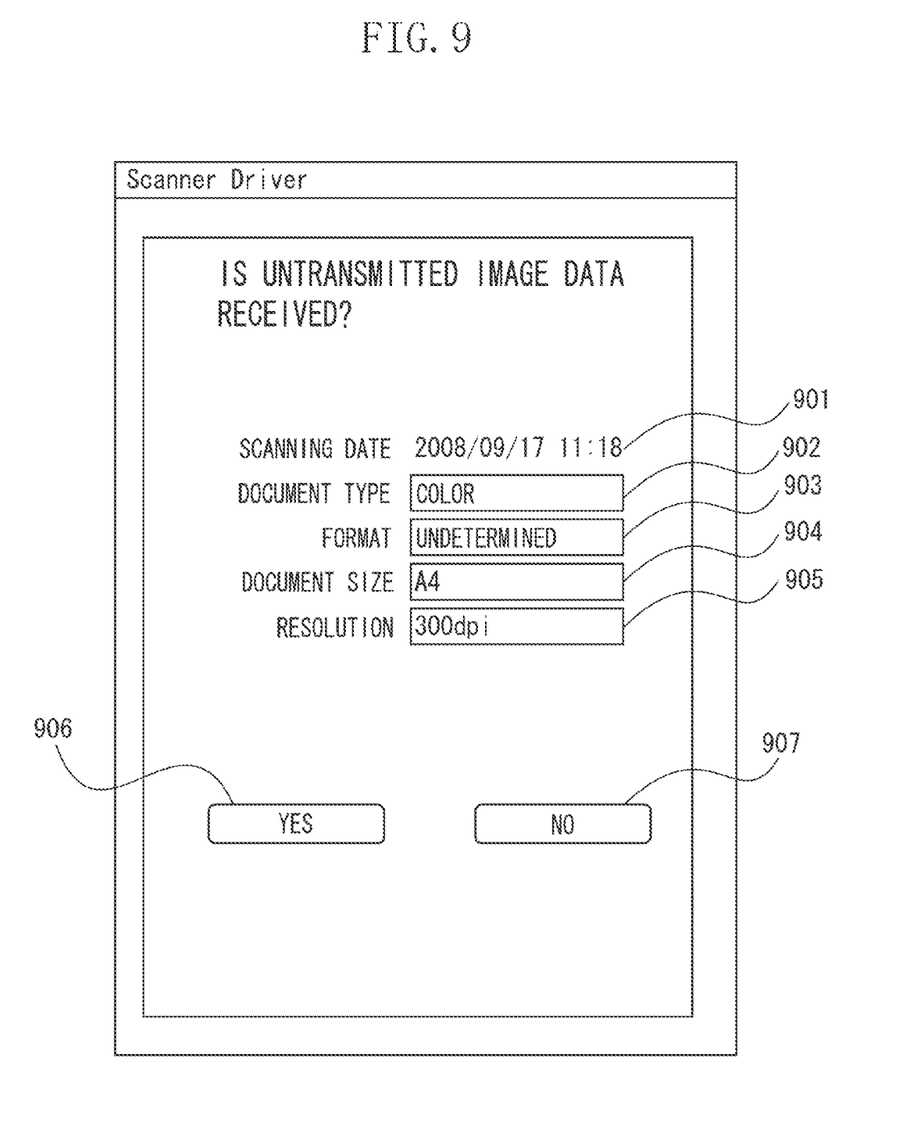
FIG. 9 illustrates a screen of a scanner driver displayed on the PC according to the present exemplary embodiment.

FIG. 9 illustrates an example of the screen for issuing an instruction to transmit the untransmitted image data displayed at this time. The screen illustrated in FIG. 9 includes a column 901 which indicates the time and date on which scanning is executed in the image processing apparatus 101. Scan settings for the image data are displayed in columns 902 to 905. FIG. 9 illustrates an example in which the document type is "color", the resolution of an image is "300 dpi", and the document size is "A4" when scanning is executed in the image processing apparatus 101. The format of the image may be processed on the side of the PC, and has not been determined on the screen.

Pieces of information displayed in the columns 901 to 905 are based on the information received in step S605. The user can confirm on the PC whether the untransmitted image data corresponds to the data that he/she has given an instruction to perform pseudo Push scanning by referring to the displayed information. The user can change the contents of the scan settings displayed in the columns 902 to 905, as needed.

For the document type displayed in the column 902, both "color" and "monochrome" can be selected when the untransmitted image data is read in color. When the untransmitted image data has been read in monochrome, "color" cannot be selected. For the format displayed in the column 903, all formats that can be processed in the PC can be selected. For the document size displayed in the column 904 and the resolution displayed in the column 905, values smaller than scan settings when the image data is read can be selected.

In step S606, the PC changes the scan settings, as needed. The user then presses a "YES" button or a "NO" button to determine whether to receive the untransmitted image data.

In step S607, the PC determines whether the user gives an instruction to receive the untransmitted image data. When the user has given the instruction to receive the untransmitted image data (YES in step S607), the processing proceeds to step S608. Whereas if not (NO in step S607), the processing proceeds to step S611. The processing in step S611 and the subsequent steps is the normal Pull scanning, as described above.

If the instruction to receive the untransmitted image data is given, the PC transmits a request to the image processing apparatus 101 for transmission of the untransmitted image data. In step S608, the PC receives the untransmitted image data from the image processing apparatus 101. In step S609, the PC performs image processing on the received image data based on the scan settings set in step S606. In step S610, the PC then stores the image data in a predetermined storage unit, and terminates the processing.

The PC does not perform the display in step S603 when it is notified that the transmission of the untransmitted image data is completed from the image processing apparatus 101 in step S513. Thus, the untransmitted image data can be prevented from being transmitted to the plurality of PCs.

In the above described exemplary embodiment, image data which is read and generated by the reader device included in the image processing apparatus 101 is described as an example of image data to be input to the image processing apparatus 101. However, image data may be input to the image processing apparatus 101 from the external device such as the PC. Further, image data may be previously input to the image processing apparatus 101 and stored in the memory therein.

In the above described exemplary embodiment, the multifunction peripheral including the scanner and the printer is described as an example of the image processing apparatus, however it may be an apparatus, other than the multifunction peripheral, having the function of transmitting the input image data to the external device.

Further, when the image processing apparatus stores the scan information and the image data in step S506 in the above described exemplary embodiment, arbitrary ID (identification information) may be issued and stored by associating therewith, and the ID may be displayed together with a message that transmission is not completed in step S507.

When the PC transmits the request for transmission of the scan information in step S604, the PC may prompt the user to input the ID, and transmit the scan information transmission request together with the input ID. The image processing apparatus 101 that has received the scan information transmission request transmits only the image data associated with the received ID to the PC. Accordingly, only a user who has confirmed the message that transmission is not completed (a user who has requested to perform pseudo Push scanning) can receive the untransmitted image data, resulting in improved security.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-142535 filed Jun. 15, 2009, which is hereby incorporated by reference herein in its entirety.

What is claimed is:

1. An image processing apparatus capable of transmitting input image data to an external device, the image processing apparatus comprising:

a display unit configured to display a list of information indicating candidates for transmission destinations to which the image data is transmitted;

a selection unit configured to select any one of the information in the list displayed by the display unit;

a determination unit configured to determine whether the information selected by the selection unit includes a string of characters that is the same as a string of characters in other information in the list, wherein a transmission destination indicated by the selected information is different from a transmission destination indicated by the other information; and a transmission unit configured to transmit, when the selected information does not include a string of characters that is the same as a string of characters in the other information in the list, the image data to the transmission destination indicated by the selected information, and to transmit, when the selected information includes a string of characters that is the same as a string of characters in the other information in the list, information indicating that the image data has not been transmitted to the transmission destination indicated by the selected information, wherein the transmission unit transmits, in response to reception from the external device which has received the information indicating that the image data has not been transmitted of a request to transmit untransmitted image data, the untransmitted image data to the external device.

2. The image processing apparatus according to claim 1, wherein the information in the list displayed by the display unit includes a name indicating the external device.

3. The image processing apparatus according to claim 2, wherein the transmission unit transmits, when the selected information includes a string of characters that is the same as a string of characters in the other information in the list, the information indicating that the image data has not been transmitted to the transmission destination indicated by the selected information and to the transmission destination indicated by the other information.

4. The image processing apparatus according to claim 3, wherein when the transmission unit transmits the untransmitted image data to the external device in response to reception of the request to transmit the untransmitted image data from the external device that has received the information indicating that the image data has not been transmitted, the transmission unit notifies the external devices other than the external device that has received the information indicating that the image data has not been transmitted of completion of transmission of the untransmitted image data.

5. A method for controlling an image processing apparatus capable of transmitting input image data to an external device, the method comprising:
  displaying a list of information indicating candidates for transmission destinations to which the image data is transmitted on a display unit;
  selecting any one of the information in the list displayed on the display unit;
  determining whether the selected information includes a string of characters that is the same as a string of characters in other information in the list, wherein a transmission destination indicated by the selected information is different from a transmission destination indicated by the other information;
  transmitting, when the selected information does not include a string of characters that is the same as a string of characters in the other information in the list, the image data to the transmission destination indicated by the selected information, and transmitting, when the selected information includes a string of characters that is the same as a string of characters in the other information in the list, information indicating that the image data has not been transmitted to the transmission destination indicated by the selected information; and
  transmitting, in response to reception from the external device which has received the information indicating that the image data has not been transmitted of a request to transmit untransmitted image data, the untransmitted image data to the external device.

6. A non-transitory computer-readable recording medium recording a computer program for causing an image processing apparatus capable of transmitting input image data to an external device to execute steps of:
  displaying a list of information indicating candidates for transmission destinations to which the image data is transmitted on a display unit;
  selecting any one of the information in the list displayed on the display unit;
  determining whether the selected information includes a string of characters that is the same as a string of characters in other information in the list, wherein a transmission destination indicated by the selected information is different from a transmission destination indicated by the other information;
  transmitting, when the selected information does not include a string of characters that is the same as a string of characters in the other information in the list, the image data to the transmission destination indicated by the selected information, and transmitting, when the selected information includes a string of characters that is the same as a string of characters in the other information in the list, information indicating that the image data has not been transmitted to the transmission destination indicated by the selected information; and
  transmitting, in response to reception from the external device which has received the information indicating that the image data has not been transmitted of a request to transmit untransmitted image data, the untransmitted image data to the external device.

* * * * *